United States Patent
Yun

(10) Patent No.: US 10,549,621 B2
(45) Date of Patent: Feb. 4, 2020

(54) HYDRAULIC MOUNT HAVING UNIDIRECTIONAL DAMPING MEMBRANE

(71) Applicants: HYUNDAI MOTOR COMPANY, Seoul (KR); KIA MOTORS CORPORATION, Seoul (KR)

(72) Inventor: Jae-Hyung Yun, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/836,700

(22) Filed: Dec. 8, 2017

(65) Prior Publication Data

US 2019/0111772 A1    Apr. 18, 2019

(30) Foreign Application Priority Data

Oct. 16, 2017  (KR) .......................... 10-2017-0133732

(51) Int. Cl.
| | | |
|---|---|---|
| *F16D 13/10* | (2006.01) | |
| *B60K 5/12* | (2006.01) | |
| *F16F 13/10* | (2006.01) | |
| *F16F 13/26* | (2006.01) | |
| *F16F 13/22* | (2006.01) | |

(52) U.S. Cl.
CPC ............ *B60K 5/1208* (2013.01); *F16F 13/10* (2013.01); *F16F 13/22* (2013.01); *F16F 13/26* (2013.01)

(58) Field of Classification Search
CPC ...... F16F 13/262; F16F 13/264; F16F 13/105; F16F 13/26; F16F 13/107; F16F 13/266; F16F 13/268; F16F 13/106; F16F 13/08; F16F 13/10; F16F 13/102
USPC ...................................... 267/140.13
See application file for complete search history.

(56) References Cited

U.S. PATENT DOCUMENTS

| | | | | |
|---|---|---|---|---|
| 4,416,445 A | * | 11/1983 | Coad ......................... | F16F 9/08 137/493.8 |
| 4,679,776 A |   | 7/1987  | Remmel et al. | |
| 4,711,206 A | * | 12/1987 | Andra ...................... | F16F 13/22 248/636 |
| 4,746,104 A | * | 5/1988  | Probst ..................... | F16F 13/08 180/309 |

(Continued)

FOREIGN PATENT DOCUMENTS

| | | | | |
|---|---|---|---|---|
| DE | 4307148 A1 | * | 9/1994 | ............ F16F 13/106 |
| EP | 0189510 A1 |   | 4/1985 | |

(Continued)

*Primary Examiner* — Bradley T King
*Assistant Examiner* — Stephen M Bowes
(74) *Attorney, Agent, or Firm* — Knobbe Martens Olson & Bear LLP

(57) ABSTRACT

The present disclosure relates to a hydraulic mount having a unidirectional damping membrane. A hole is formed in a membrane and a one-way closure having upper and lower portions, which are different from each other, is inserted into the hole to control a flow of a fluid. The one-way closure means includes: a body which intermittently closes a lower side of the hole formed at a center of the membrane; a column portion which is vertically formed at a center of the body; and a moving closure which is formed at an upper portion of the column portion and closes an upper side of the hole.

8 Claims, 5 Drawing Sheets

(56) References Cited

U.S. PATENT DOCUMENTS

| | | | | |
|---|---|---|---|---|
| 5,029,824 | A | * | 7/1991 | LaBeau ................. F16F 13/106 267/140.13 |
| 6,126,153 | A | | 10/2000 | Hein et al. |
| 6,409,158 | B1 | * | 6/2002 | Takashima ............ F16F 13/101 267/140.13 |
| 2006/0249891 | A1 | * | 11/2006 | Ueki ..................... F16F 13/105 267/140.13 |
| 2010/0072683 | A1 | * | 3/2010 | Saito ..................... F16F 13/106 267/140.13 |

FOREIGN PATENT DOCUMENTS

| | | | | |
|---|---|---|---|---|
| JP | 2001-214953 | A | | 8/2001 |
| JP | 2002-349631 | A | | 12/2002 |
| KR | 10-1262412 | B1 | | 5/2013 |
| KR | 10-1769304 | B1 | | 8/2017 |
| WO | WO-2008156169 | A1 | * | 12/2008 ............ F16F 13/106 |
| WO | WO-2016063627 | A1 | * | 4/2016 .............. F16F 13/10 |

\* cited by examiner

HYDRAULIC MOUNT HAVING UNIDIRECTIONAL DAMPING MEMBRANE

CROSS-REFERENCE TO RELATED APPLICATIONS

This application claims priority under 35 U.S.C. § 119 to Korean Patent Application No. 10-2017-0133732, filed on Oct. 16, 2017, with the Korean Intellectual Property Office, the disclosure of which is incorporated herein by reference in its entirety.

BACKGROUND

1. Field

The present disclosure relates to a hydraulic mount having a unidirectional damping membrane.

2. Description of the Related Art

In general, an engine of a vehicle always and structurally vibrates due to a periodic change in center position of the engine caused by upward and downward movements of a piston and a connecting rod, and a periodic change in inertial force applied to reciprocating parts in an axial direction of a cylinder, inertial force occurring when the connecting rod is rattled leftward and rightward about a crank shaft, and rotational force applied to the crank shaft.

The causes of the vibration do not act separately but always act in a complex manner, such that the engine vibrates upward and downward and leftward and rightward. In particular, an engine having a small number of cylinders more greatly vibrates than an engine having a large number of cylinders, and the engine more greatly vibrates when the engine operates at a low speed than when the engine operates at a high speed.

As described above, the vibration inevitably occurs when the engine operates, and the vibration generated by the engine is transferred to a vehicle interior through a vehicle body on which the engine is installed. The vibration transferred to the vehicle interior causes discomfort to an occupant and degrades a pleasant driving environment, and an occupant's body may be seriously injured if the vibration is intense.

The disclosure of this section is to provide background of the invention. Applicant notes that this section may contain information available before this application. However, by providing this section, Applicant does not admit that any information contained in this section constitutes prior art.

SUMMARY

An engine mount having a vibration proof function is provided between the engine and the vehicle body in order to prevent the vibration from being transferred to the vehicle body. There are a rubber engine mount manufactured by using rubber, a hydraulic engine mount in which a liquid having viscosity is encapsulated to improve vibration damping force, and an air damper mount which is filled with air instead of a fluid to ensure a damping effect.

The rubber engine mount is inexpensive compared to a fluid engine mount but disadvantageous in damping characteristics. The fluid engine mount has an advantage because the fluid engine mount insulates vibration and noise by means of a damping effect in respect to a fluid mass, but the fluid engine mount is disadvantageous because the fluid engine mount is expensive.

The air damper mount is disadvantageous in terms of costs compared to the rubber engine mount but advantageous in terms of costs compared to the fluid engine mount, and the air damper mount is disadvantageous in terms of performance compared to the fluid engine mount but advantageous in terms of performance compared to the rubber engine mount. Assuming that an operating chamber of the air damper mount has a size and a shape similar to those of the fluid damper mount, the air damper mount has a lower performance than the fluid damper mount because air, which has lower properties such as viscosity than oil, is used as a working fluid.

To solve the problems, the inventions in the related art, which are disclosed in WO 2004/031608 and Japanese Patent Application Laid-Open Nos. 2002-349631 and 2001-214953, adopt a method of increasing friction damping by increasing the amount of fluid flowing between the operating chambers in respect to the same variation in vibration, and to this end, a diameter of the mount is increased.

However, since the working fluid is air, which is a compressive fluid, in the air damping mount in the related art, a damping performance is exhibited by friction damping as the air passes through a die channel in the case of vibration with a low frequency, but the air does not pass through the die channel in the case of vibration with a predetermined frequency or higher. For this reason, the damping performance deteriorates, and a situation similar to a situation in which a working chamber is sealed is made, such that pressure in the working chamber is increased, and stiffness of the mount is increased.

Therefore, as a solution for solving the problems, "Air Damping Mount with Variable Effective Area" disclosed in Korean Patent No. 10-1262412 has been developed.

As illustrated in FIG. 1, the damping mount includes an engine mounting unit 10 which is fixed to an engine, a main rubber 11 which is coupled to a lower side of the engine mounting unit 10 and attenuates vibration being transferred from the engine, an upper chamber 13 which is installed at a lower side of the main rubber 11 so as to be filled with air, and has a die channel 12 that is penetratively formed at one side of a bottom surface to allow air to flow inward and outward, a working chamber 14 which is installed at a lower side of the upper chamber 13 so as to be filled with air, and has an outside air connecting hole 14a that is penetratively formed at one side to communicate with outside air, a rigid chamber 15 which is installed at a lower side of the working chamber 14 so as to be filled with air, and has an installation hole 15a that is penetratively formed at one side of an upper surface to communicate with the working chamber 14, a plurality of pressure transfer tubes 17 which allows the rigid chamber 15 and the upper chamber 13 to communicate with each other so that the air with which the rigid chamber 15 and the upper chamber 13 are filled may flow, and an effective area control rod 16 which is installed in the rigid chamber 15 while penetrating the installation hole 15a so as to be movable upward and downward, and changes an effective area of the die channel, which is an actual area through which the air flows through the die channel 12, while moving upward and downward in accordance with pressure in the rigid chamber 15 that varies in accordance with pressure in the upper chamber 13.

The air damping mount with a variable effective area is lowered in proportion to an increase in pressure when internal pressure of the rigid chamber 150 is equal to or higher than stiffness of a leaf spring as pressure in the upper chamber 13 increases, and the air damping mount returns to the original position when the internal pressure of the rigid chamber 15 is equal to or lower than the stiffness of the leaf spring as the pressure in the upper chamber 13 decreases. A diaphragm portion 15b moves the effective area control rod 16 while moving upward and downward in accordance with the pressure in the rigid chamber 15 that varies in accordance with a change in pressure in the upper chamber 13, thereby changing the effective area of the die channel 12.

However, the diaphragm portion 15b receives pressure of the fluid flowing from the upper chamber 13 or the rigid chamber 15 since the control rod 16 is integrated with the diaphragm portion 15b, and in this case, an operating unit 16c having a conical shape tends not to properly block the installation hole 15a due to unbalance of liquid pressure or the like.

DOCUMENTS OF RELATED ART

1. U.S. Pat. No. 4,679,776 (Jul. 14, 1987)
2. Japanese Patent Application Laid-Open No. 2002-349631 (Dec. 4, 2002)
3. Japanese Patent Application Laid-Open No. 2001-214953 (Aug. 10, 2001)
4. Korean Patent No. 10-1262412 (May 2, 2013)
5. Korean Patent No. 10-1769304 (Aug. 11, 2017)

The present disclosure relates to a hydraulic mount having a unidirectional damping membrane, in which a hole is formed in a membrane and a one-way closure having upper and lower portions, which are different from each other, is inserted into the hole to control a flow of a fluid.

The present disclosure has been made in an effort to provide a hydraulic mount having a unidirectional damping membrane, in which a hole is formed in a membrane and a one-way closure made of a soft material such as an insulator or a silicone material is installed in the hole, such that low dynamic properties may be made as the one-way closure moves into the hole formed in the membrane when a fluid flows into a lower liquid chamber, and a high damping value may be obtained as the hole is closed by the one-way closure such that the fluid flows only into an orifice when the fluid flows into an upper liquid chamber.

An embodiment of the present invention provides a hydraulic mount which includes: an engine mount 10 which has a center bolt that is inserted into a housing 20 and fastened to an engine; a main rubber 11 which is provided at an outer circumferential surface of the engine mount; and a membrane 30 which vibrates in response to elastic behavior of the main rubber and divides an interior into an upper liquid chamber and a lower liquid chamber, thereby providing a driver seated in a vehicle with comfortable ride quality by absorbing an impact applied to the vehicle and thus preventing damage to a vehicle body or maintaining coupled states of components. A hole 31 is formed at a central portion of the membrane 30 so that a fluid flows into the upper liquid chamber and the lower liquid chamber by outside pressure, and a one-way closure means 100 is installed in the hole 31. The one-way closure means 100 includes: a body 110 which intermittently closes a lower side of the hole 31 formed at the center of the membrane 30; a column portion 120 which is vertically formed at a center of the body; and a moving closure 130 which is formed at an upper portion of the column portion and closes an upper side of the hole 31.

The hydraulic mount having a unidirectional damping membrane according to embodiments of the present invention may have the following effects.

First, since the one-way closure means is installed in the membrane, such that low dynamic properties may be made as the one-way closure means moves into the hole formed in the membrane when the fluid flows into the lower liquid chamber, and a high damping value may be obtained as the hole is closed by the one-way closure such that the fluid flows only into the orifice when the fluid flows into the upper liquid chamber.

Second, the one-way closure means is installed at the center of the membrane, a longitudinal protrusion is formed at the upper portion of the one-way closure means, and a lateral protrusion is formed at the lower portion of the one-way closure means, such that a flow of the fluid may vary (in a low frequency band, an intermediate frequency band, and a high frequency band).

Third, a metal material is inserted into any one or both of the body and the column portion that constitute the one-way closure means, and as a result, the one-way closure means may serve as a dynamic damper.

Fourth, the one-way closure means into which the metal material is inserted shifts a resonance region of the mount to a low frequency band, and as a result, it is easy to separate the resonance region from a vehicle vibratory frequency.

DETAILED DESCRIPTION OF THE EMBODIMENTS

Figure 1:
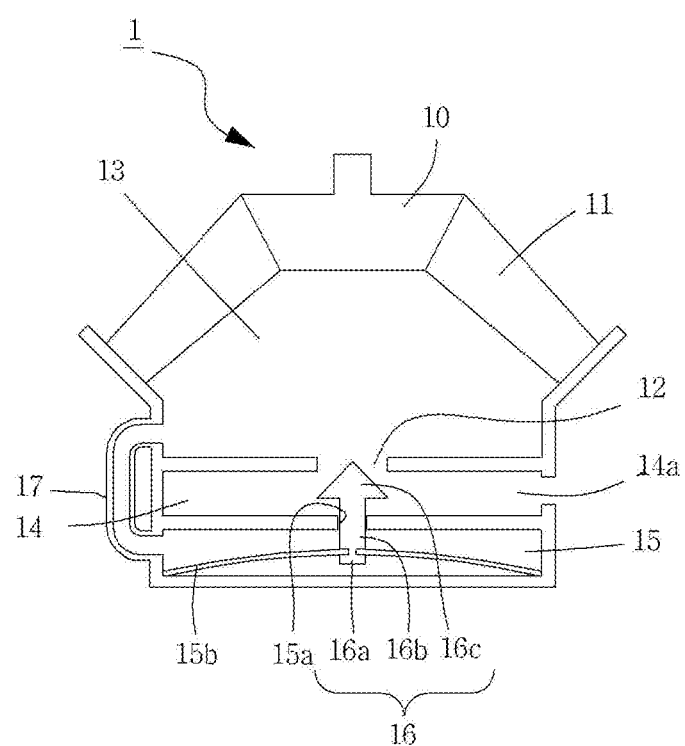
FIG. 1 is a view illustrating a cross section of an engine mount for a vehicle.

Hereinafter, embodiments of the present invention will be described in detail with reference to the accompanying drawings so that those skilled in the art to which the present invention pertains may easily carry out the present invention. However, the present invention may be implemented in various different ways, and is not limited to embodiments described herein.

A part irrelevant to the description will be omitted to clearly describe embodiments of the present invention, and the same or similar constituent elements will be designated by the same reference numerals throughout the specification.

Terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Hereinafter, embodiments of the present invention will be described in detail with reference to the accompanying drawings.

According to an aspect of the present invention, a hydraulic mount for mounting an engine on a vehicle frame is disclosed. The hydraulic mount comprising two liquid chambers—an upper liquid chamber and a lower liquid chamber. An elastic membrane 30 interposed between the liquid chambers has a through hole 31 connecting the upper liquid chamber and the lower liquid chamber.

In embodiments, a rigid closure member 100 inserted into the through hole 31, in its closing position (with respect to the through hole 31), blocks liquid communication between the upper liquid chamber and the lower liquid chamber when no external vibration is transferred to the hydraulic engine mount. In embodiments, in response to an upward vibration from the bottom of the lower liquid chamber, the rigid closure member 100 is lifted, from the closing position to an opening position, to allow liquid communication between the upper liquid chamber and the lower liquid chamber such that damping against the upward vibration is provided.

In embodiments, in response to a downward vibration applied from the top of the upper liquid chamber, the closure member 100 moves down together with a portion of the membrane contacting the closure member 100. However the closure member 100 remains its closing position with respect to the through hole 31 such that disconnection between the upper liquid chamber and the lower liquid chamber is maintained regardless of downward movement of the closure member 100. Accordingly, flow between the two liquid chambers across the membrane through the hole 31 is restricted to one direction from the lower liquid chamber to the upper liquid chamber such that damping of the hydraulic mount is unidirectional (responsive to an upward vibration from the bottom and not responsive to a downward vibration from the top).

Figure 2:
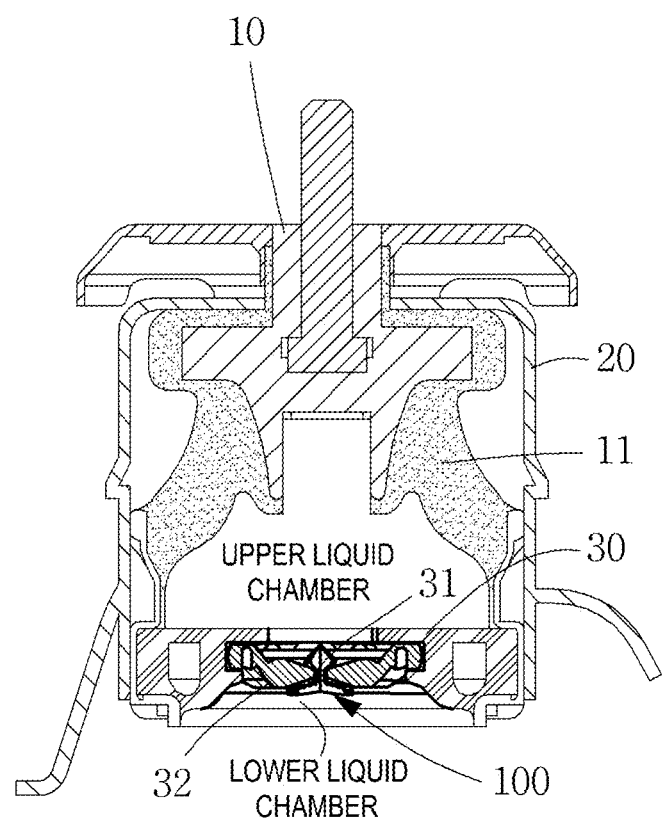
FIG. 2 is a cross-sectional view illustrating a state in which a hydraulic mount having a unidirectional damping membrane according to embodiments of the present invention is installed.

As illustrated in FIG. 2, a hydraulic mount having a unidirectional damping membrane according to embodiments of the present invention is basically identical to the related art in that the hydraulic mount includes an engine mount 10 which has a center bolt that is inserted into a housing 20 and fastened to an engine, a main rubber 11 which is provided at an outer circumferential surface of the engine mount, and a membrane 30 which vibrates in response to elastic behavior of the main rubber and divides an interior into an upper liquid chamber and a lower liquid chamber.

In some embodiments, a hole 31 is formed at a central portion of the membrane 30 so that a fluid flows into the upper liquid chamber and the lower liquid chamber by outside pressure, and a one-way closure means 100 is installed in the hole 31.

Figure 3:
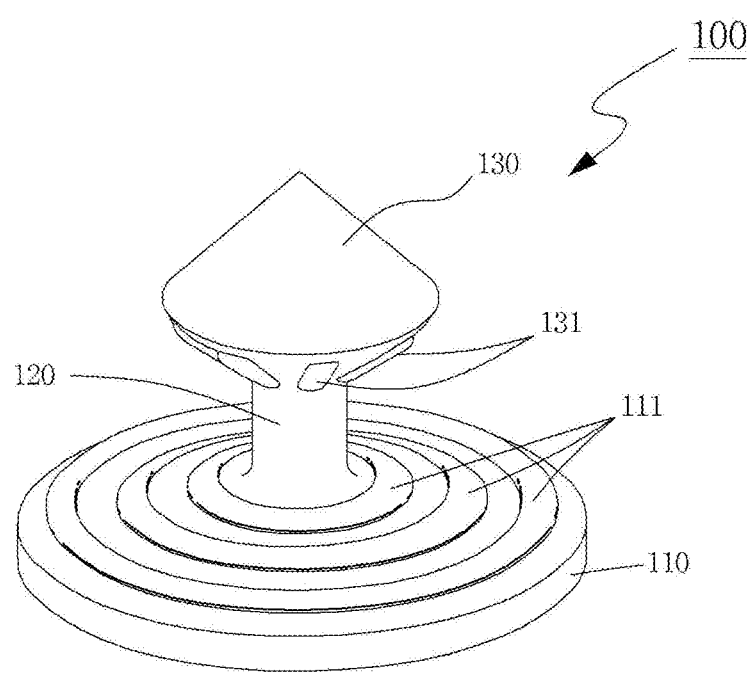
FIG. 3 is a perspective view illustrating only a one-way closure means according to embodiments of the present invention.
Figure 4A:
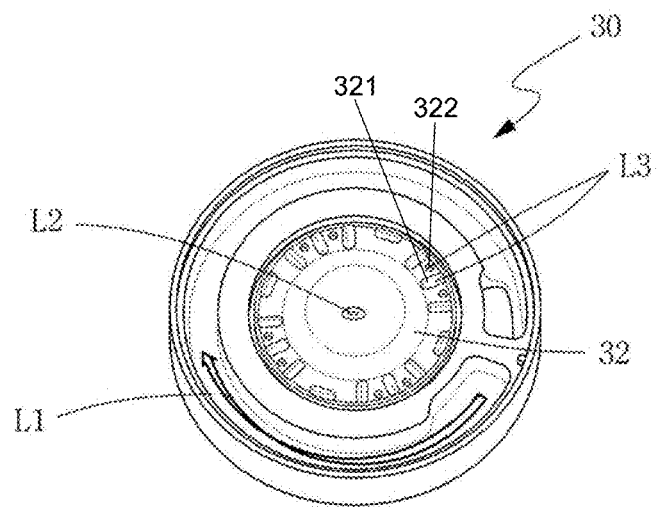
FIGS. 4A and 4B illustrate a membrane on which the one-way closure means according to embodiments of the present invention is installed.
Figure 4B:
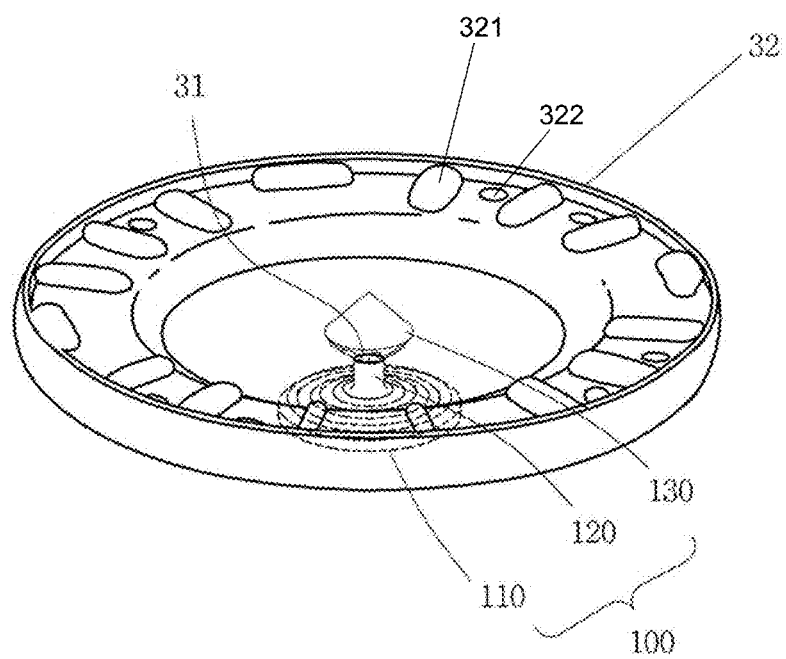

In more detail, the one-way closure means 100 is made of an insulator or a silicone material, and as illustrated in FIG. 3 or FIGS. 4A and 4B, a body 110 is formed to intermittently close a lower side of the hole 31 formed at the center of the membrane 30, and a column portion 120 is vertically formed at a center of the body 110.

A moving closure 130 for closing an upper side of the hole formed in the membrane 30 is integrally formed at an upper portion of the column portion 120.

In this case, the upper portion of the body 110 has a conical shape entirely having an inclined surface, and ring-shaped protrusions 111 protrude at an equal interval about a center of the column portion 120. In addition, a lower portion of the moving closure 130 has an inverted conical shape, and a plurality of longitudinal protrusions 131 protrudes at an equal interval. The longitudinal protrusion 131 is a protrusion in the form of a long band and serves to allow the fluid to flow through the hole 31 formed in the membrane 30 when the fluid flows from the upper liquid chamber to the lower liquid chamber, that is, the longitudinal protrusion 131 serves as a dual orifice.

Therefore, as described above, a target frequency dualization is enabled by dynamic characteristics by the dual orifice, and resistance is reduced when the fluid flows, such that dynamic characteristics may be established.

In addition, as the ring-shaped protrusions 111 close the hole 31 formed in the membrane 30, a flow of the fluid flowing from the upper liquid chamber to the lower liquid chamber is perfectly blocked, and a flow of the fluid is guided only to the orifice, thereby ensuring high damping properties.

Figure 5A:
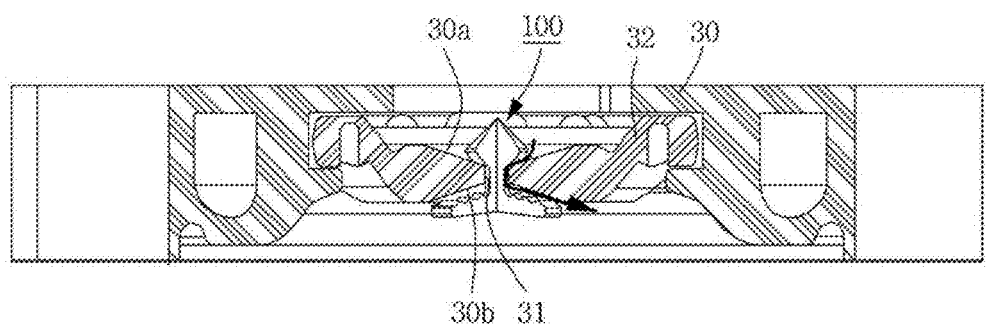
FIGS. 5A and 5B are cross-sectional views illustrating an operation of the one-way closure means according to embodiments of the present invention.

As illustrated in FIG. 5A, an upper surface of the membrane has a first inclined portion 30a which comes into contact with the lower portion of the moving closure 130 that constitutes the one-way closure means 100, an orifice 32, which has a second inclined portion 30b that comes into contact with the body 110, is installed on a lower surface of the membrane 30, and the first and second inclined surfaces 30a and 30b are inclined toward the hole 31.

FIG. 4A is a view for explaining various flow paths, and FIGS. 4A and 4B are views illustrating a state in which the one-way closure means is installed in an orifice formed in the membrane. As illustrated in FIG. 4A, a first flow path L1 is formed in the membrane 30 to send the fluid in the upper liquid chamber to the lower liquid chamber, the hole 31 formed at the center is used as a second flow path L2. As illustrated in FIG. 4A, a plurality of protrusions 321 and a plurality of holes 322 formed between the first and second flow paths L1 and L2 provide third flow paths L3. As illustrated in FIG. 4A, the plurality of protrusions 321 extend from the orifice 32.

In this case, the protrusions have various shapes and heights, such that low dynamic characteristics may be implemented in accordance with the heights and the shapes of the protrusions.

A metal material may be inserted into any one or both of the body 110 and the column portion 120 that constitute the one-way closure means 100, thereby allowing the one-way closure means 100 to serve as a dynamic damper.

With this performance, a resonance region of the mount is shifted to a low frequency band, such that it is easier to separate the resonance region from a vehicle vibratory frequency.

Therefore, as illustrated in FIGS. 4A and 4B, in the hydraulic mount having a unidirectional damping membrane according to embodiments of the present invention, the three flow paths, that is, the first flow path L1, the second flow path L2, and the third flow path L3 are formed in the membrane 30, such that it is possible to ensure dynamic characteristics and a loss factor in a low frequency region by adjusting lengths and sizes of the flow paths when the fluid flows through the first flow path L1.

Figure 5B:
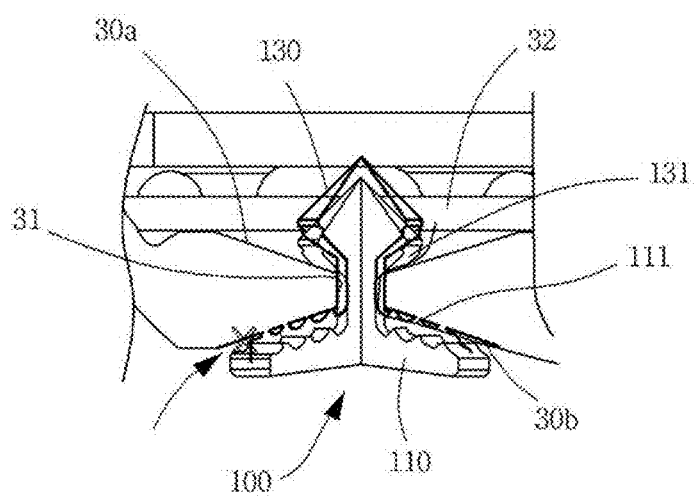

FIG. 5A is a view illustrating a state in which a fluid flows from an upper liquid chamber to a lower liquid chamber, and FIG. 5B is a view illustrating a state in which the one-way closure means is raised to close the flow path.

As illustrated in FIGS. 5A and 5B, the one-way closure means 100 is installed in the hole 31 formed at the center of the membrane 30, such that when the fluid flows through the second flow path L2, the fluid may flow from the upper liquid chamber to the lower liquid chamber, but a flow of the fluid from the lower liquid chamber to the upper liquid chamber is blocked, thereby ensuring a high loss factor.

That is, as illustrated in FIG. 5B, the ring-shaped protrusions 111 formed on the body 110 tightly block the lower inclined surface 30b of the orifice 32, such that an additional flow path in the arrow direction is blocked, thereby ensuring a high damping performance in accordance with an inertia damper.

Therefore, it is possible to obtain low dynamic characteristics and a high loss factor in an intermediate frequency region.

The plurality of protrusions formed on the orifice 32 has different shapes and different heights, such that when the fluid flows through the third flow path L3, the fluid flows intermittently. This flow of the fluid may implement low dynamic characteristics, and this method is identical to a method of implementing a performance of a fluid mount that constitutes the existing floating type membrane.

The metal material may be inserted into any one or both of the body 110 and the column portion 120 that constitute the one-way closure means 100, thereby allowing the one-way closure means 100 to serve as a dynamic damper. With this performance, a resonance region of the mount is shifted to a low frequency band, such that it is easier to separate the resonance region from a vehicle vibratory frequency.

While the present invention has been described with reference to its embodiments and the accompanying drawings, different embodiments may be implemented within the spirit and the scope of the present invention. Therefore, it should be construed that the scope of the present invention is defined by the appended claims, and not limited to a particular embodiment disclosed in the present specification.

What is claimed is:

1. A hydraulic mount comprising:
    an engine mount including a center bolt that is inserted into a housing for fixing the engine mount to an engine;
    a main rubber provided at an outer circumferential surface of the engine mount; and
    a membrane configured to vibrate in response to deformation of the main rubber and to divide an interior space of the hydraulic mount into an upper liquid chamber and a lower liquid chamber,
    wherein a hole is formed at a central portion of the membrane so that a fluid flows into the upper liquid chamber and the lower liquid chamber by outside pressure, and
    wherein a one-way closure means is installed in the hole such that damping is enabled only in one direction,
    wherein the one-way closure means includes a moving closure which is formed at an upper portion of a column portion and configured to close an upper side of the hole formed in the membrane, and
    wherein a lower portion of the moving closure has an inverted conical shape, and has a plurality of longitudinal protrusions formed at an equal interval.

2. The hydraulic mount of claim 1, wherein the one-way closure means includes:
    a body configured to intermittently close a lower side of the hole formed at the center of the membrane; and
    the column portion which is vertically formed at a center of the body and connected to the lower portion of the moving closure.

3. The hydraulic mount of claim 1, wherein the one-way closure means is made of an insulator or a silicone material.

4. The hydraulic mount of claim 2, wherein the membrane includes an orifice, which is installed on a lower surface of the membrane and has a plurality of protrusions and a plurality of holes.

5. The hydraulic mount of claim 2, wherein an upper portion of the body has an inclined surface, and has ring-shaped protrusions protruding at an equal interval about a center of the column portion.

6. The hydraulic mount of claim 1, wherein an upper surface of the membrane has a first inclined portion which comes into contact with a lower portion of the moving closure, and a lower surface of the membrane has a second inclined portion which comes into contact with the body.

7. The hydraulic mount of claim 1, wherein the membrane includes:
    a first flow path which is formed to send the fluid in the upper liquid chamber to the lower liquid chamber;
    a second flow path which is formed at a center of the membrane and in which the one-way closure means is installed; and
    a third flow path which is installed between the first and second flow paths.

8. The hydraulic mount of claim 1, wherein a metal material is inserted into any one or both of the body and the column portion that constitute the one-way closure means.

* * * * *